Figure 1:
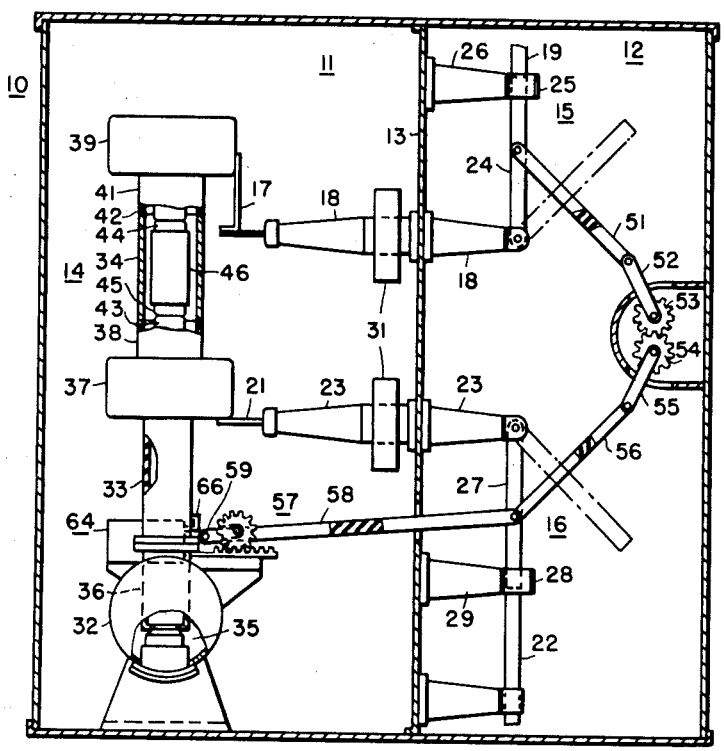

June 26, 1956  J. B. MacNEILL ET AL  2,752,448
SWITCHING EQUIPMENT FOR COMPRESSED AIR CIRCUIT BREAKERS
Filed April 27, 1951

WITNESSES:

INVENTORS
John B. MacNeill and
Benjamin P. Baker.
BY
ATTORNEY

United States Patent Office 2,752,448
Patented June 26, 1956

2,752,448

SWITCHING EQUIPMENT FOR COMPRESSED AIR CIRCUIT BREAKERS

John B. MacNeill, Wilkinsburg, and Benjamin P. Baker, Turtle Creek, Pa., assignors to Westinghouse Electric Corporation, East Pittsburgh, Pa., a corporation of Pennsylvania Application April 27, 1951, Serial No. 223,361

7 Claims. (Cl. 200—82)

Our invention relates, generally, to switching equipment and, more particularly, to switching equipment for compressed air circuit breakers.

In this country, compressed air circuit breakers for indoor applications up to and including 34.5 kilovolts generally have been of the splitter type. For outdoor applications and higher voltages, compressed air circuit breakers of the orifice type have been utilized.

Usually, a circuit breaker of the orifice type requires as a part thereof an isolating switch which is opened to remove the voltage from the interrupter as soon as the arc is extinguished, since the interrupting contacts are usually biased to move to closed position as soon as the air pressure is cut off. This isolating switch which is an essential part of the circuit breaker, has been used in addition to the usual disconnect switches which are used to disconnect the circuit breaker from each of the two lines. In order to be utilized for indoor applications it is desirable that the circuit breakers be suitable for installation in sheet metal cubicles similar to those provided for housing low-voltage compressed air circuit breakers, along with the disconnect switches, current transformers, potential transformers and other auxiliary equipment associated with the circuit breakers. Heretofore, the disconnect switches for circuit breakers have been located in a separate compartment and operated by a mechanism not directly associated with the circuit breaker.

An object of our invention, generally stated, is to provide an enclosed compressed air circuit breaker which shall be simple and efficient in operation and which may be economically manufactured and installed.

A more specific object of our invention is to simplify the structure and the operation of the switching equipment for a compressed air circuit breaker.

Another object of our invention is to combine the functions of an isolating switch and a disconnect switch for a compressed air circuit breaker.

A further object of our invention is to operate the disconnect switches for a compressed air circuit breaker by means of a fluid-pressure mechanism associated with the circuit breaker.

Other objects of our invention will be explained fully hereinafter or will be apparent to those skilled in the art.

In practicing our invention, the usual isolating switch for a compressed air circuit breaker of the orifice type is eliminated and its function performed by disconnect switches located in the rear compartment of the cubicle enclosing the breaker and the disconnect switches. The disconnect switches are operated by a fluid-pressure mechanism which is so controlled that the disconnect switches are opened after the arc is extinguished by the breaker interrupter.

Figure 2:
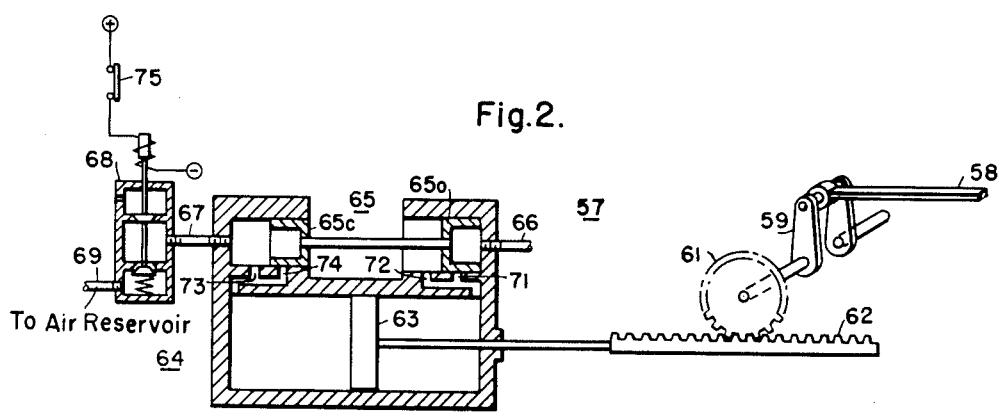

For a better understanding of the nature and objects of our invention, reference may be had to the following detailed description, taken in conjunction with the accompanying drawing, in which:

Figure 1 is a view, partly in section and partly in side elevation, of a switchgear unit embodying the principal features of our invention, and Fig. 2 is an enlarged detail view of a portion of the operating mechanism for the disconnect switches shown in Fig. 1.

Referring to the drawing, and particularly to Fig. 1, the structure shown therein comprises a metal enclosed cubicle 10 having a breaker compartment 11 and a switch compartment 12. The two compartments are separated by a metal partition 13. A circuit breaker 14 of the air blast type is disposed in the breaker compartment 11. Disconnect switches 15 and 16 are disposed in the switch compartment 12.

One terminal 17 of the circuit breaker 14 is electrically connected to a power bus (not shown) through an insulated conductor 18, which is supported by the partition 13, the disconnect switch 15 and a power conductor 19. Another terminal 21 of the circuit breaker is electrically connected to a feeder conductor 22 through an insulated conductor 23, which is supported by the partition 13, and the disconnect switch 16.

The disconnect switch 15 comprises a hinged blade 24 which is supported by one end of the terminal conductor 18 and engages contact members 25 which are supported by an insulator 26 mounted on the partition 13. The conductor 19 is connected to the contact members 25. The disconnect switch 16 comprises a hinged blade 27 which is supported by one end of the terminal conductor 23 and engages contact members 28 which are supported by an insulator 29. Current transformers 31 may be mounted on the terminal conductors 18 and 23.

The circuit breaker 14 may be of the orifice type described in a copending application of B. P. Baker and H. M. Wilcox, Serial No. 73,516, filed January 29, 1949, now Patent No. 2,646,483. Since the construction of the circuit breaker is fully described in the aforesaid application, it is believed to be unnecessary to describe it in detail in the present application.

Briefly, the circuit breaker comprises a compressed air tank or reservoir 32, an insulating blast tube 33 which extends upwardly above the top of the tank and is supported by the tank, an interrupter assembly 34 and a blast valve 35 which is disposed inside of the tank 32 at the lower end of a metal extension 36 of the blast tube 33. A metal exhaust chamber 37 is disposed at the upper end of the blast tube 33 and is spaced from the interrupter assembly 34 by an insulating tube 38. Another exhaust chamber 39 is disposed at the top of the breaker unit and is spaced from the interrupter assembly 34 by an insulating tube 41. The breaker terminals 17 and 21 are supported by the exhaust chambers 39 and 37, respectively.

As described in the aforesaid application, a stationary contact member 42 is preferably formed integrally with and electrically connected to the exhaust chamber 39. Another stationary contact member 43 is formed integrally with and electrically connected to the exhaust chamber 37. Movable contact members 44 and 45 which engage the stationary contact members 42 and 43, respectively, are slidably disposed in a cylinder 46 and are biased outwardly against the stationary contact members by springs disposed within the cylinder 46.

The configuration of the movable contact members 44 and 45 is such that the pressure of an air blast which is admitted to the blast tube 33 when the blast valve 35 is opened presses the movable contact members away from their respective stationary contact members, thereby initiating a circuit interrupting operation of the breaker. When the movable contact members are separated from their associated stationary contact members, orifices in the stationary contact members are uncovered which permit a blast of air to move through the orifice, thereby extinguishing the arcs between the movable and stationary contact members in the manner described in the aforesaid copending application. It will be understood that the operation of the blast valve 35 may be controlled by means of a tripping mechanism in the manner described in the aforesaid application.

As mentioned hereinbefore, circuit breakers of the orifice type have previously required an isolating switch for removing the voltage from the interrupter as soon as the arc is extinguished, thereby permitting the blast valve 35 to be closed to shut off the air blast and, consequently, permitting the contact members of the interrupter to be reclosed while the circuit is maintained open. In metal-enclosed switchgear, disconnect switches which are located in a separate compartment from the circuit breaker have been provided for disconnecting both terminals of the circuit breaker from their associated power conductors, thereby completely isolating the circuit breaker from all power conductors when it is desired to work on the circuit breaker. Interlocking means have been provided for preventing the opening of the disconnect switches while the contact members of the circuit breaker are closed and for preventing access to the breaker compartment while the disconnect switches are closed. Such disconnect switches have not usually been operated on every operation of the circuit breaker.

In order to simplify the structure and the operation of the switchgear assembly, we have combined the functions of the isolating switch previously required for the circuit breaker and the disconnect switches and have provided for operating the disconnect switches on every operation of the circuit breaker to keep the circuit open, by an actuating mechanism which is directly controlled by the circuit breaker. In this manner the circuit breaker isolating switch, the operating mechanism previously required for operating the disconnect switches, and the interlocking means previously required for insuring the proper sequence of operation are eliminated.

As shown in Fig. 1 the disconnect switches 15 and 16 are interconnected through an insulating link 51, a crank arm 52, gears 53 and 54, a crank arm 55 and an insulating link 56. The blade 27 of the disconnect switch 16 is connected to an actuating mechanism 57 by means of an insulating link 58 and a crank arm 59. The actuating mechanism 57 is mounted on the tank 32. The actuating mechanism 57 may be of the type described in the copending application of B. P. Baker and H. M. Wilcox, Serial No. 73,516, filed January 29, 1949, now Patent No. 2,646,483, dated July 21, 1953.

As shown in Fig. 2 the crank arm 59 is rotated by a pinion 61 driven by a rack 62 which is connected to a piston 63 disposed in a pneumatic actuating mechanism 64. The operation of the piston 63 is controlled by a double-piston air valve 65 having pistons 65o and 65c opposing each other. The piston 65o which controls the opening of the disconnect switches is preferably of a greater diameter than the piston 65c which controls the closing of the disconnect switches, thereby permitting the opening piston to predominate over the closing piston in the event of a conflict in the application of air pressure to the pistons. Air pressure is applied to the piston 65o through a pipe 66 which is connected to the blast tube 33 as shown in Fig. 1. Air pressure is applied to the piston 65c through a pipe 67 which is connected to a magnet valve 68. The magnet valve 68 is connected to the tank 32 or another suitable source of compressed air through a pipe 69.

The air valve 65 is provided with ports 71 and 72 which are so disposed that when the piston 65o is moved to the left by compressed air admitted through the pipe 66 the port 72 is covered and the port 71 is uncovered to cause the piston 63 to be moved to the left, thereby rotating the pinion 61 in a direction to open the disconnect switches. The air valve 65 is also provided with ports 73 and 74 which are so disposed that when the piston 65c is actuated to the right the port 74 is covered and the port 73 uncovered to cause the piston 63 to be moved to the right, thereby closing the disconnect switches. The ports 72 and 74 permit air to be exhausted from behind the piston 63 during its operation.

The energization of the solenoid coil of the magnet valve 68 may be controlled in any desired manner, as by means of a control switch 75 located on a suitable control panel (not shown). When the solenoid coil is energized, the valve 68 is operated to permit air to enter the pipe 67, thereby causing the piston 65c to be moved to the right which, in turn, operates the piston 63 to close the disconnect switches.

As described in the aforesaid copending application Serial No. 73,516, now Patent No. 2,646,483, the operation of the actuating mechanism 57 is so controlled by the fluid pressure in the blast tube 33 of the circuit breaker, which, in turn, is controlled by the opening of the blast valve 35, that the disconnect switches are opened after the interrupter assembly 34 of the circuit breaker has completed its circuit interrupting operation. As described in the aforesaid copending application the bleeder pipe 66 enters the blast tube 33 near the bottom of the blast tube. Normally, there is no air pressure in the blast tube 33 because the blast valve 35 is closed and the compressed air which had last actuated the interrupter mechanism has been exhausted from the circuit breaker.

When the blast valve 35 is first opened to initiate a circuit interrupter operation the air blast travels upwardly in the blast tube 33 at a high velocity and because of the high velocity of the air no pressure is built up in the bleeder tube 66. When the first inrush of the air blast has been stopped at the top of the interrupter assembly the air pressure begins to build up in the tube 33, thereby building up a pressure in the bleeder tube 66 to operate the piston 65o of the air valve 65. In this manner the operation of the piston 63 is delayed sufficiently to permit the contact members of the interrupter assembly to be opened and the arc extinguished prior to the opening of the disconnect switches 15 and 16.

The opening of the disconnect switches 15 and 16 disconnects the terminals of the circuit breaker from all power conductors, thereby removing the voltage from the circuit breaker and completely isolating it from the power conductors. It will be noted that the opening of the disconnect switches is automatically controlled through the operation of the actuating mechanism 57 to obtain the desired sequence of operation of the disconnect switches. Furthermore, the function of the isolating switch previously required for circuit breakers of the present type is performed by the disconnecting switches, thereby simplifying the structure by eliminating the isolating switch.

As shown in Fig. 2, when the switch 75 is closed the magnet valve 68 is operated to admit compressed air to the actuating mechanism 57 which is operated to close the disconnect switches. As previously explained, the interrupter contacts of the circuit breaker are reclosed after the disconnect switches are opened to remove voltage from the breaker and the breaker contacts normally remain closed, but the circuit through the breaker is kept open by the disconnect switches. Thus, the reclosing of the disconnect switches reestablishes a circuit through the breaker.

In order to simplify the drawing and description, we have illustrated and described the apparatus required for a single pole circuit breaker and its associated disconnect switches. It will be understood that additional apparatus similar to that described may be added to provide a circuit breaker having two or more poles. The additional poles for the circuit breaker may be supplied with compressed air from one common air reservoir, or separate reservoirs may be provided if desired. The additional disconnect switches for the additional poles may be operated from the one actuating mechanism 57 by connecting them to extensions of the crank arms 52 and 55 by links similar to the links 51 and 56.

From the foregoing description it is apparent that we have provided for simplifying a switchgear assembly, thereby reducing its size and cost. Furthermore, the safety of the operating personnel is assured since the proper sequence of operation of the circuit breaker and the disconnect switches is automatically secured.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a switchgear structure, in combination, a cubicle having a breaker compartment and a switch compartment, a vertical partition separating said compartments, a circuit breaker of the air blast type disposed in the breaker compartment, said breaker having a pair of contacts one of which is movable to open the circuit and then recloses and a valve mechanism for controlling the operation of said breaker contacts, insulated conductors electrically connected to said breaker contacts, said conductors extending horizontally through said partition, a pair of disconnect switches disposed in the switch compartment, each disconnect switch having one terminal connected to one of said insulated conductors, said switches being connected in series-circuit relation with the breaker contacts through said conductors on opposite sides of the contacts, a fluid-actuated mechanism for operating said switches, said valve mechanism controlling the operation of said fluid-actuated mechanism to open the switches to isolate the breaker after each opening of the breaker contacts and before they reclose, with said disconnecting switches then maintaining the circuit through the breaker contacts open, and manually controlled valve means for controlling the operation of the fluid-actuated mechanism to close said switches, said valve means admitting a pressure fluid to the fluid-actuated mechanism when the valve means is in one position and exhausting the pressure fluid when the valve means is in another position.

2. In a switchgear structure, in combination, a cubicle having a breaker compartment and a switch compartment, a circuit breaker of the air blast type disposed in the breaker compartment, said breaker having a pair of contacts one of which is movable to open the circuit and then recloses and a valve mechanism for controlling the operation of said breaker contacts, insulated conductors electrically connected to said breaker contacts, said conductors extending from the breaker compartment into the switch compartment, a pair of disconnect switches disposed in the switch compartment, each disconnect switch having one terminal connected to one of said insulated conductors, said switches being connected in series-circuit relation with the breaker contacts through said conductors on opposite sides of the contacts, a fluid-actuated mechanism for operating said switches jointly, said valve mechanism controlling the operation of said fluid-actuated mechanism to open the switches to isolate the breaker after each opening of the breaker contacts and before they reclose, with said disconnecting switches then maintaining the circuit through the breaker contacts open, and manually controlled valve means for controlling the operation of the fluid-actuated mechanism to close said switches, said valve means admitting a pressure fluid to the fluid-actuated mechanism when the valve means is in one position and exhausting the pressure fluid when the valve means is in another position.

3. In a switchgear structure, in combination, a cubicle having a breaker compartment and a switch compartment, a vertical partition separating said compartments, a circuit breaker, of the air blast type disposed in the breaker compartment, said breaker having a pair of contacts one of which is movable to open the circuit and then recloses and a valve mechanism for controlling the operation of said breaker contacts, insulated conductors electrically connected to said breaker contacts, said conductors extending horizontally through said partition, a first disconnect switch electrically connected to one of said breaker contacts through one of said conductors, a second disconnect switch electrically connected to another of said breaker contacts through another of said conductors, said switches being disposed in the switch compartment and connected in series-circuit relation with said contacts, a fluid-actuated mechanism for operating said switches, said valve mechanism controlling the operation of said fluid-actuated mechanism to open the switches and completely isolate the breaker after each opening of the breaker contacts and before they reclose, with said disconnecting switches then maintaining the circuit through the breaker contacts open, and manually controlled valve means for controlling the operation of the fluid-actuated mechanism to close said switches, said valve means admitting a pressure fluid to the fluid-actuated mechanism when the valve means is in one position and exhausting the pressure fluid when the valve means is in another position.

4. In a switchgear structure, in combination, a cubicle having a breaker compartment and a switch compartment, a circuit breaker of the air blast type disposed in the breaker compartment, said breaker having a pair of contacts one of which is movable to open the circuit and then recloses and a valve mechanism for controlling the operation of the breaker contacts, insulated conductors electrically connected to said breaker contacts, said conductors extending from the breaker compartment into the switch compartment, a tube connecting the valve mechanism and the contacts, a pair of disconnect switches disposed in the switch compartment, each disconnect switch having one terminal connected to one of said insulated conductors, said switches being connected in series-circuit relation through said conductors on opposite sides of the contacts, gear means interconnecting the switches, a fluid-actuated mechanism for driving said gear means to operate said switches jointly to isolate the breaker after each opening of the breaker contacts and before they reclose, with said disconnecting switches then maintaining the circuit through the breaker contacts open, and control means responsive to the fluid pressure in the tube for controlling the operation of said fluid-actuated mechanism, and an electrically-actuated valve for controlling the operation of said fluid-actuated mechanism to close said switches, said valve admitting a pressure fluid to the fluid-actuated mechanism when the valve is in one position and exhausting the pressure fluid when the valve is in another position.

5. In a switchgear structure, in combination, a cubicle having a breaker compartment and a switch compartment, a metal partition separating said compartments, a circuit breaker of the air blast type disposed in the breaker compartment, said breaker having a pair of contacts one of which is movable to open the circuit and then recloses and a valve mechanism for controlling the operation of the breaker contacts, insulated conductors electrically connected to said breaker contacts, said conductors extending through said partition, a tube connecting the valve mechanism and the contacts, a pair of disconnect switches disposed in the switch compartment, each disconnect switch having one terminal connected to one of said insulated conductors, said switches being connected in series-circuit relation with the contacts through said conductors on opposite sides of the contacts, gear means interconnecting said switches, a fluid-actuated mechanism for operating said switches simultaneously to isolate the breaker after each opening of the breaker contacts and before they reclose, with said disconnecting switches then maintaining the circuit through the breaker contacts open, and control means connected to said tube and responsive to the fluid pressure in the tube for controlling the operation of said fluid-actuated mechanism, and an electrically-actuated valve for controlling the operation of said fluid-actuated mechanism to close said switches, said valve admitting a pressure fluid to the fluid-actuated mechanism when the valve is in one position and exhausting the pressure fluid when the valve is in another position.

6. In a switchgear structure, in combination, a circuit breaker having a self-closing interrupter contact slidably disposed between a pair of vertically spaced stationary contacts and movable to open the circuit and then reclose, control means for controlling the opening of said interrupter contact, a fixed conductor connected to each stationary contact, a pair of vertically spaced disconnect switches connected in series-circuit relation with said contacts through said conductors on opposite sides of said contacts, an actuating mechanism associated with the circuit breaker for operating the switches, said mechanism being responsive to operational conditions in the circuit breaker to open said disconnect switches simultaneously to isolate the breaker following each opening of the breaker interrupter contact and before it recloses, said disconnecting switches then maintaining the circuit through the breaker contacts open, and manually controlled electrically operated control means for controlling the operation of said mechanism to close said switches while the breaker interrupter contact is closed.

7. In a switchgear structure, in combination, a circuit breaker having self-closing interrupter contacts slidably disposed between a pair of spaced stationary contacts and movable to open the circuit and then reclose, control means for controlling the opening of said interrupter contacts, a fixed conductor connected to each stationary contact, a pair of spaced disconnect switches connected in series-circuit relation with said contacts through said conductors on opposite sides of said contacts, an actuating mechanism associated with the circuit breaker for operating the switches, said mechanism being responsive to operational conditions in the circuit breaker to open said disconnect switches to isolate the breaker following each opening of the breaker interrupter contacts and before they reclose, said disconnecting switches then maintaining the circuit through the breaker contacts open, and manually controlled electrically operated control means for controlling the operation of said mechanism to close said switches to complete an electric circuit through the closed breaker interrupter contacts.

References Cited in the file of this patent

UNITED STATES PATENTS

| | | |
|---|---|---|
| 2,089,285 | Milliken | Aug. 10, 1937 |
| 2,340,095 | Wilcox | Jan. 25, 1944 |
| 2,363,364 | Rugg | Nov. 21, 1944 |
| 2,374,703 | Reilly | May 1, 1945 |
| 2,379,188 | Rugg | June 26, 1945 |
| 2,418,739 | Thumin et al. | Apr. 8, 1947 |
| 2,450,628 | Boisseau et al. | Oct. 5, 1948 |
| 2,491,112 | Jansson | Dec. 13, 1949 |
| 2,495,181 | Pierson | Jan. 17, 1950 |
| 2,538,042 | Reilly | Jan. 16, 1951 |
| 2,646,483 | Baker et al. | July 21, 1953 |

FOREIGN PATENTS

| | | |
|---|---|---|
| 511,757 | Great Britain | Aug. 23, 1939 |